(12) United States Patent
Byun et al.

(10) Patent No.: US 9,728,765 B2
(45) Date of Patent: Aug. 8, 2017

(54) RECHARGEABLE BATTERY HAVING FUSE UNIT

(71) Applicant: Samsung SDI Co., Ltd., Yongin-si, Gyeonggi-do (KR)

(72) Inventors: Sang-Won Byun, Yongin-si (KR); Jeong-Won Oh, Yongin-si (KR); Min-Seok Koo, Yongin-si (KR); Yun-Jung Kwak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 330 days.

(21) Appl. No.: 14/559,445

(22) Filed: Dec. 3, 2014

(65) Prior Publication Data

US 2015/0280204 A1     Oct. 1, 2015

(30) Foreign Application Priority Data

Mar. 31, 2014  (KR) ........................ 10-2014-0038016

(51) Int. Cl.
| | |
|---|---|
| *H01M 2/34* | (2006.01) |
| *H01M 2/26* | (2006.01) |
| *H01M 10/04* | (2006.01) |
| *H01M 10/654* | (2014.01) |

(52) U.S. Cl.
CPC ............. *H01M 2/348* (2013.01); *H01M 2/26* (2013.01); *H01M 10/0413* (2013.01); *H01M 10/0431* (2013.01); *H01M 10/654* (2015.04); *H01M 2/345* (2013.01); *H01M 2200/103* (2013.01)

(58) Field of Classification Search
None
See application file for complete search history.

(56) References Cited

U.S. PATENT DOCUMENTS

2013/0004831 A1     1/2013  Byun et al.

FOREIGN PATENT DOCUMENTS

| KR | 10-2011-0133255 A | 12/2011 |
| KR | 10-2013-0003148 A | 1/2013 |

*Primary Examiner* — Jonathan Crepeau
(74) *Attorney, Agent, or Firm* — Lewis Roca Rothgerber Christie LLP

(57) ABSTRACT

A rechargeable battery includes: an electrode assembly including a first electrode and a second electrode, a case configured to receive the electrode assembly, a first current collecting member including a first fuse unit coupled to the first electrode and having a cross-sectional area that is smaller than a cross-sectional area of a periphery of the first current collecting member, and a second current collecting member including a second fuse unit coupled to the second electrode and having a cross-sectional area that is smaller than a cross-sectional area of a periphery of the second current collecting member, in which the first fuse unit is configured to melt more quickly than the second fuse unit at a first current, and the second fuse unit is configured to melt more quickly than the first fuse unit at a second current that is lower than the first current.

12 Claims, 8 Drawing Sheets

RECHARGEABLE BATTERY HAVING FUSE UNIT

CROSS-REFERENCE TO RELATED APPLICATION

This application claims priority to and the benefit of Korean Patent Application No. 10-2014-0038016, filed in the Korean Intellectual Property Office on Mar. 31, 2014, the entire content of which is incorporated herein by reference.

BACKGROUND

1. Field

The subject matter disclosed herein relates generally to a rechargeable battery, for example, to a rechargeable battery having a fuse unit.

2. Description of the Related Art

A rechargeable battery is a battery that is capable of being charged after having been discharged, unlike a primary battery that is not designed to be charged, discharged, and charged again. A low capacity rechargeable battery is used (utilized) in a small electronic portable device such as, for example, a mobile phone, a laptop computer, and a camcorder. A large capacity battery is extensively used (utilized) as a power supply for a motor for driving (e.g., propelling) a hybrid vehicle.

Recently, a high power rechargeable battery including a non-aqueous electrolyte having high energy density has been developed. The high power rechargeable battery includes (or is constituted by) a large capacity rechargeable battery in which a plurality of rechargeable batteries are connected in series in order to use (utilize) the high power rechargeable battery to drive devices requiring a large amount of electric power, for example, motors such as those for electric vehicles.

Further, one large capacity rechargeable battery generally includes a plurality of rechargeable batteries connected in series. The rechargeable batteries may have cylindrical and angular shapes.

When an extraordinary reaction (e.g., thermal runaway) occurs in a rechargeable battery having a case formed of a material, such as a metal, the pressure therein increases, and there is a risk of explosion or ignition of the rechargeable battery.

The above information disclosed in this Background section is only for enhancement of understanding of the background of the subject matter disclosed herein and therefore it may contain information that does not form the prior art that is already known in this country to a person of ordinary skill in the art.

SUMMARY

Aspects of embodiments of the subject matter disclosed herein are directed toward a rechargeable battery in which different fuse units are melted according to a current quantity (or amount).

An example embodiment provides a rechargeable battery including an electrode assembly including a first electrode and a second electrode. A case is configured to receive the electrode assembly. A first current collecting member includes a first fuse unit coupled to the first electrode and having a cross-sectional area that is smaller than a cross-sectional area of a periphery of the first current collecting member. A second current collecting member includes a second fuse unit connected to the second electrode and having a cross-sectional area that is smaller than a cross-sectional area of a periphery of the second current collecting member. The first fuse unit may be configured to melt more quickly than the second fuse unit at a first current. The second fuse unit may be configured to melt more quickly than the first fuse unit at a second current that is lower than the first current.

In some embodiments, a melting point of the first fuse unit is M1, a melting point of the second fuse unit is M2, and a resistance of the first fuse unit may be equal to M1/M2 multiplied by a resistance of the second fuse unit.

The second fuse unit may be longer than the first fuse unit. The second fuse unit may have a cross-sectional area that is smaller than a cross-sectional area of the first fuse unit.

The first fuse unit may include a material having a specific resistance that is higher than a specific resistance of a material of the second fuse unit. A melting point of the material of the first fuse unit may be lower than a melting point of the material of the second fuse unit.

The first fuse unit may include aluminum, and the second fuse unit may include copper. A heat emitting member configured to diffuse heat may be at the first fuse unit. An adiabatic member configured to reduce emission of heat may be at the second fuse unit.

The first current may be 1.5 times to 3.5 times the second current. The first current may be 500 to 3000 A, and the second current may be 3000 to 10,000 A.

The case may be electrically coupled to the first electrode. A cap plate may be fastened to the case. A short-circuit member that is configured to be deformed by an increase in internal pressure of the rechargeable battery to electrically couple the first electrode and the second electrode may be at the cap plate.

According to the example embodiment, because a first fuse unit is melted at a first current and a second fuse unit is melted at a second current that is lower than the first current, it is possible to stably block an over-current even though the over-current (e.g., the second current) flows in a relatively small quantity.

BRIEF DESCRIPTION OF THE DRAWINGS

The accompanying drawings, together with the specification, illustrate embodiments of the present disclosure, and, together with the description, serve to explain the principles of the present disclosure.

DETAILED DESCRIPTION

Figure 1:
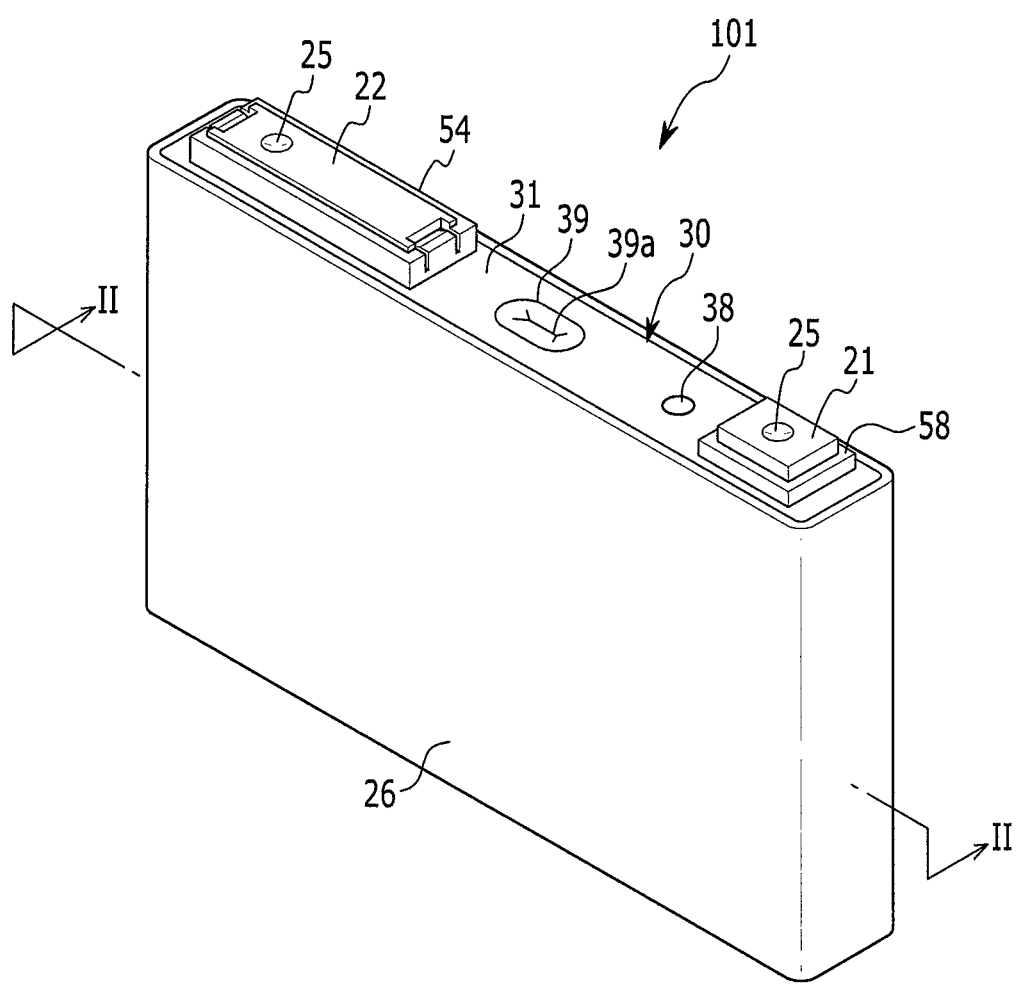
FIG. 1 is a perspective view of a rechargeable battery according to a first example embodiment of the present invention.

Hereinafter, example embodiments of the present disclosure will be described with reference to the accompanying drawings so that those skilled in the art may easily practice the present invention. As those skilled in the art would realize, the described embodiments may be modified in various different ways, all without departing from the spirit or scope of the present invention. In the drawings and description, like reference numerals designate like elements throughout the specification. Also, in the context of the present application, when a first element is referred to as being "on" a second element, it can be directly on the second element or be indirectly on the second element with one or more intervening elements interposed therebetween. Expressions such as "at least one of," when preceding a list of elements, modify the entire list of elements and do not modify the individual elements of the list. Further, the use of "may" when describing embodiments of the present invention refers to "one or more embodiments of the present invention."

Figure 2:
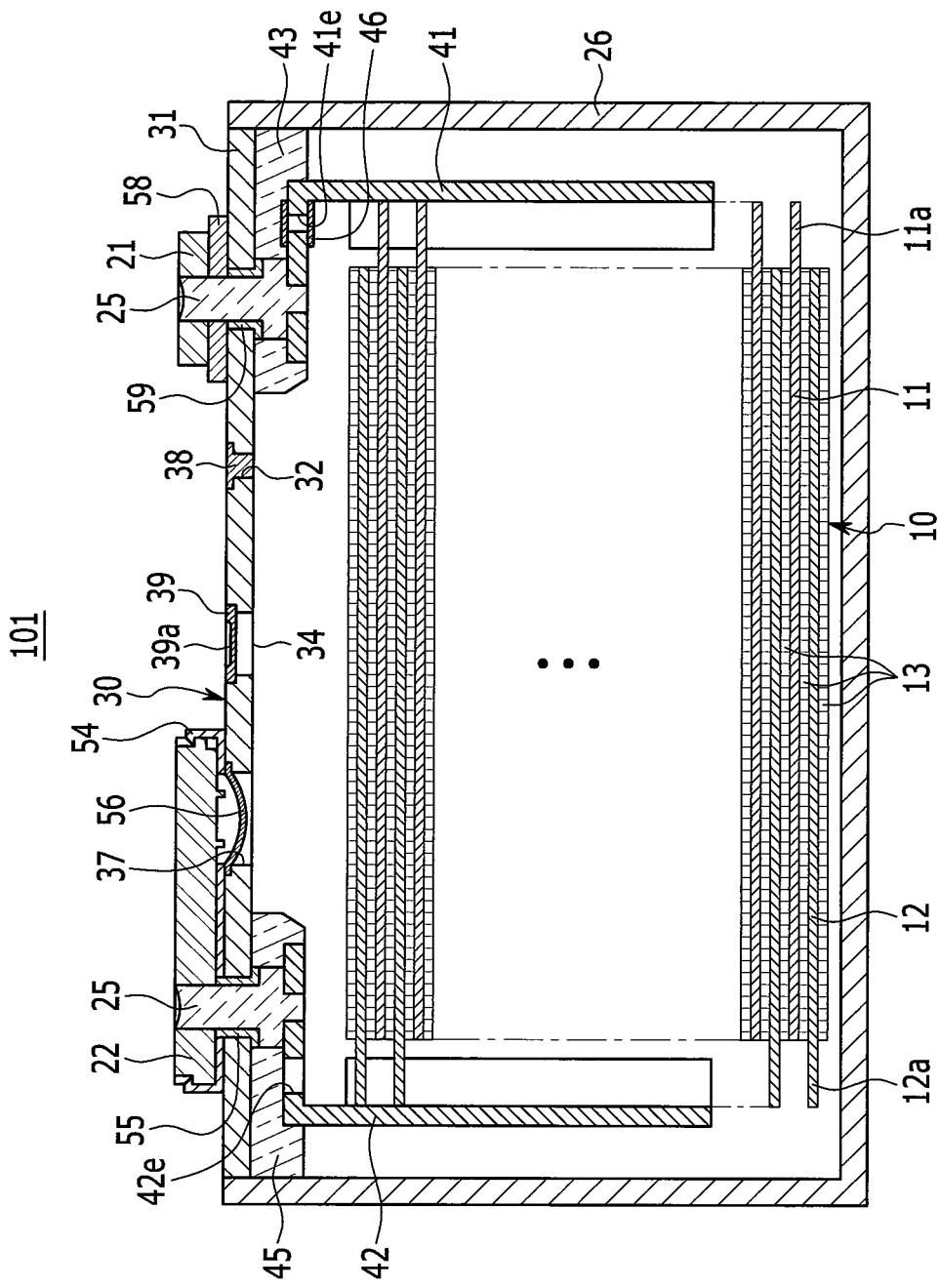
FIG. 2 is a cross-sectional view taken along the line II-II of FIG. 1.

FIG. 1 is a perspective view of a rechargeable battery according to a first example embodiment of the present invention. FIG. 2 is a cross-sectional view taken along the line II-II of FIG. 1.

Referring to FIGS. 1 and 2, a rechargeable battery 101 according to the present first example embodiment includes an electrode assembly 10 wound while interposing a separator 13 between a positive electrode (first electrode) 11 and a negative electrode (second electrode) 12, a case 26 receiving the electrode assembly 10, and a cap assembly 30 fastened to an opening of the case 26.

The rechargeable battery 101 according to the present example embodiment will be described with reference to an example having an angular shape as a lithium ion rechargeable battery (e.g., a prismatic battery). However, the present invention is not limited thereto, and may be applied to various types (kinds) of batteries such as a lithium polymer battery and/or a cylindrical battery.

The positive electrode 11 and the negative electrode 12 include a coated region as a region in which an active material is applied on a current collector including (or formed of) a metal foil of a thin plate, and uncoated regions 11a and 12a as regions in which the active material is not applied. A positive electrode uncoated region 11a is at (or formed at) a side end of the positive electrode 11 in a length direction of the positive electrode 11, and a negative electrode uncoated region 12a is at (or formed at) a side end of the negative electrode 12 in a length direction of the negative electrode 12 (e.g., at a side end of the negative electrode 12 that is opposite to the side end of the positive electrode 11, as shown in FIG. 2). In addition, the positive electrode 11 and the negative electrode 12 are wound after the separator 13, as an insulator, is interposed therebetween.

However, the present invention is not limited thereto, and the electrode assembly 10 may have a structure where the positive electrode and the negative electrode including a plurality of sheets are layered while the separator is interposed therebetween.

The case 26 is (or is formed as) an approximate cuboid, and an opening is at (or formed in) a side thereof. The case 26 may include (or be formed of) a metal such as aluminum and/or stainless steel.

The cap assembly 30 includes a cap plate 31 covering the opening of the case 26, a first terminal 21 protruding toward the outside of the cap plate 31 and electrically connected to the positive electrode 11, and a second terminal 22 protruding toward the outside of the cap plate 31 and electrically connected to the negative electrode 12. As used herein, the terms "connected to" and "coupled to" may mean "directly connected or coupled to" or "indirectly connected or coupled to."

The cap plate 31 has a shape of an elongated plate extending in one direction, and is fastened to the opening of the case 26. A sealing stopper 38 at (or provided in) an electrolyte injection opening 32 and a vent plate 39 at (or provided in) a vent hole 34, in which a notch 39a is formed (or configured) to be opened at a predetermined (or set) pressure, are at (or provided in) the cap plate 31. The first terminal 21 and the second terminal 22 are provided to protrude over the cap plate 31.

The first terminal 21 is electrically connected to the positive electrode 11 via a first current collecting member 41, and the second terminal 22 is electrically connected to the negative electrode 12 via a second current collecting member 42. However, the present invention is not limited thereto, and the first terminal 21 may be electrically connected to the negative electrode while the second terminal 22 may be electrically connected to the positive electrode.

The first terminal 21 has a rectangular plate shape. The first terminal 21 is electrically connected to the positive electrode 11 via a connection terminal 25 adhering to the first current collecting member 41. The connection terminal 25 fastened to the first terminal 21 and the connection terminal 25 fastened to the second terminal 22 each have the same (or substantially the same) structure.

A sealing gasket 59 for sealing is between (or provided between) the first terminal 21 and the cap plate 31 to be inserted into a hole through which the terminal is provided, and a lower insulating member 43 supporting the first current collecting member 41 is under (or provided under) the cap plate 31.

A connection member 58 electrically connecting the first terminal 21 and the cap plate 31 is under (or provided under) the first terminal 21. Accordingly, the cap plate 31 and the case 26 are electrified by the positive electrode.

The second terminal 22 has a rectangular plate shape. The second terminal 22 is electrically connected to the negative electrode 12 via the connection terminal 25 adhered to the second current collecting member 42. The connection terminal 25 is provided through the cap plate 31 and the second terminal 22 such that an upper end thereof is fixed to the second terminal 22.

A sealing gasket 55 for sealing is between (or provided between) the second terminal 22 and the cap plate 31. For example, the sealing gasket 55 may be inserted into the hole through which the terminal is provided. A lower insulating member 45 insulating the second terminal 22 and the second current collecting member 42 from the cap plate 31 is under (or provided under) the cap plate 31.

Meanwhile, a short-circuit protrusion protruding toward a short-circuit hole 37 is on (or formed on) a lower portion of the second terminal 22. The second terminal 22 longitudinally extends in one direction to cover the short-circuit hole 37. An upper insulating member 54 electrically insulating the second terminal 22 and the cap plate 31 is between (or provided between) the second terminal 22 and the cap plate 31.

The cap assembly 30 includes a short-circuit member 56 short-circuiting the positive electrode 11 and the negative electrode 12. The short-circuit member 56 is electrically connected to the cap plate 31 and is deformed when internal pressure of the rechargeable battery 101 is increased and is then electrically connected to the second terminal 22.

The short-circuit hole 37 is at (or formed through) the cap plate 31, and the short-circuit member 56 is disposed between the upper insulating member 54 and the cap plate 31 in the short-circuit hole 37. The short-circuit member 56 includes a curved unit curved convexly downwardly in an arc form, and an edge unit formed outside the curved unit and fixed to the cap plate 31.

When a gas is generated due to an extraordinary reaction (e.g., thermal runaway) in the rechargeable battery, internal pressure of the rechargeable battery is increased. When internal pressure of the rechargeable battery is higher than a predetermined (or set) pressure, the curved unit is deformed to be convex upwardly. In this case, the short-circuit protrusion and the short-circuit member 56 come into contact (e.g., electrical contact) with each other to cause a short circuit.

Figure 3:
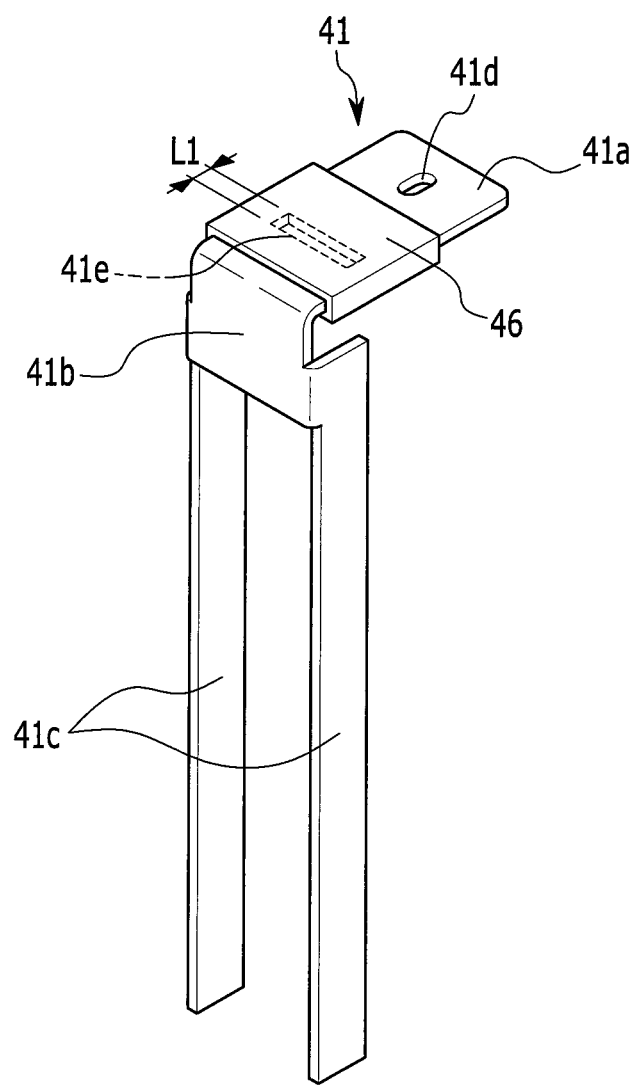
FIG. 3 is a perspective view of a first current collecting member of the rechargeable battery according to the first example embodiment of the present invention.
Figure 4:
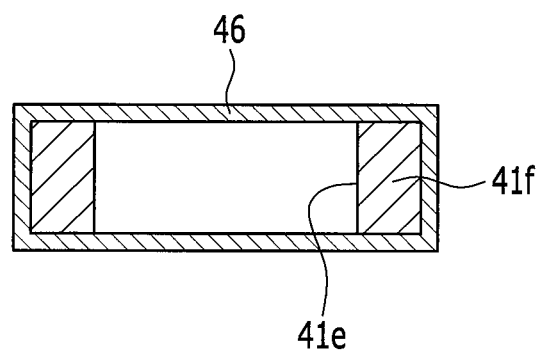
FIG. 4 is a cross-sectional view of a fuse unit of the first current collecting member according to the first example embodiment of the present invention.

FIG. 3 is a perspective view of the first current collecting member 41 according to the first example embodiment of the present invention, and FIG. 4 is a cross-sectional view of a fuse unit of the first current collecting member 41 according to the first example embodiment of the present invention.

Referring to FIGS. 3 and 4, the first current collecting member 41 includes an upper plate 41a adhered to the connection terminal 25, a side plate 41b bent from the upper plate 41a and extending downwardly toward the electrode assembly 10 (shown in FIG. 2), and two current collecting shoes 41c configured (or formed) to be connected to the side plate 41b and adhered to the electrode assembly 10.

The upper plate 41a has a quadrangular plate shape, and is fixed to a lower portion of the connection terminal 25 by, for example, welding. A fastening hole 41d is at (or formed through) the upper plate 41a. When a protrusion on (or formed on) the lower portion of the connection terminal 25 is inserted into the fastening hole 41d, the connection terminal 25 and the upper plate 41a may be, for example, welded together.

The side plate 41b is bent (or formed to be bent) downwardly from an end of a side of the upper plate to the bottom of the case 26. The two current collecting shoes 41c are bent (or formed to be bent) from the ends of both sides of the side plate 41b, and to be adhered to the positive electrode 11 by, for example, welding while being parallel (e.g., substantially parallel) to the uncoated region of the positive electrode 11. Accordingly, the current collecting shoe 41c may be (or becomes) an electrode adhesion unit electrically connected to the positive electrode 11. The two electrode assemblies 10 are disposed in the case 26. The current collecting shoes 41c are adhered to the positive electrode uncoated regions 11a of the different electrode assemblies 10.

A first fuse unit 41f having a cross-sectional area that is smaller than that of a periphery (e.g., a periphery of the first current collecting member 41 or the upper plate 41a) is on (or formed on) the upper plate 41a. A fuse hole 41e is at (or formed through) the first fuse unit 41f, and thus the first fuse unit 41f has a longitudinal cross-sectional area that is smaller than that of the periphery. The fuse hole 41e is at (or positioned at) the center of the first fuse unit 41f. The first fuse unit 41f is connected to (or formed to be connected to) ends of both sides of the fuse hole 41e.

A heat emitting member 46 for insulation and arc prevention (or reduction) is at (or provided to) the first current collecting member 41, and partially surrounds (or is provided to partially surround) the first current collecting member 41. The heat emitting member 46 surrounds the first fuse unit 41f and adjacent regions of the first fuse unit 41f, and is formed by, for example, an insert injection method (e.g., an injection molding method). The heat emitting member 46 surrounds (or is provided to surround) even the adjacent regions of the first fuse unit 41f and, thus, the heat emitting member 46 diffuses (or is configured to diffuse) heat generated from the first fuse unit 41f to the adjacent regions. When the heat emitting member 46 is provided (or present), because a heat transfer area is increased, heat generated from the first fuse unit 41f may be easily (or more easily) diffused.

The heat emitting member 46 includes (or is formed of) a material having an electric insulating property and a heat emitting (e.g., heat conducting) property. The heat emitting member 46 may include (or be formed of) polypropylene (PP), polyfluorene (PFA), polyphenylene sulfide (PPS), or polyketone (PEEK). Further, the heat emitting member 46 prevents an arc generated from the first current collecting member 41 from coming into contact with an electrolyte solution (or reduces the likelihood or amount of such arc generation). When an arc generated from the first current collecting member 41 comes into contact with the electrolyte solution, the electrolyte solution may ignite or explode due to high heat. According to embodiments of the present disclosure safety is improved, because when an arc is generated in the heat emitting member 46 the arc dissipates in the heat emitting member 46.

Figure 5:
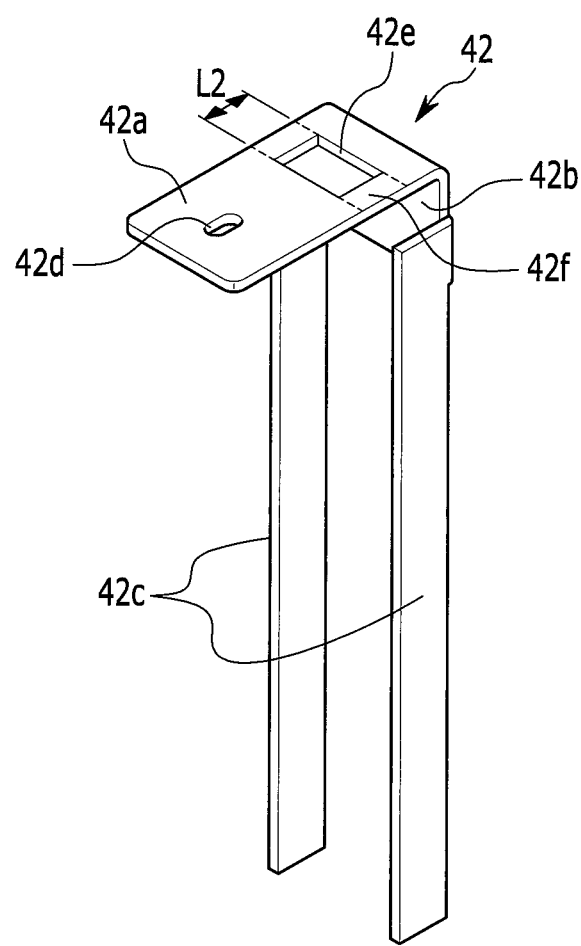
FIG. 5 is a perspective view of a second current collecting member of the rechargeable battery according to the first example embodiment of the present invention.
Figure 6:
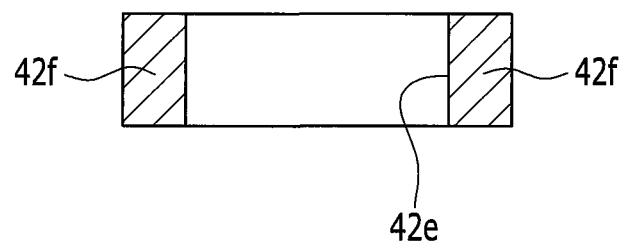
FIG. 6 is a cross-sectional view of a fuse unit of the second current collecting member according to the first example embodiment of the present invention.

FIG. 5 is a perspective view of the second current collecting member of the rechargeable battery according to the first example embodiment of the present invention, and FIG. 6 is a cross-sectional view of a fuse unit of the second current collecting member according to the first example embodiment of the present invention.

Referring to FIGS. 5 and 6, the second current collecting member 42 includes an upper plate 42a adhered to the connection terminal 25, a side plate 42b bent from the upper plate 42b and extending downwardly toward the electrode assembly 10 (shown in FIG. 2), and two current collecting shoes 42c configured (or formed) to be connected to the side plate 42b and adhered to the electrode assembly 10.

The upper plate 42a has a quadrangular plate shape, and is fixed to the lower portion of the connection terminal 25 by, for example, welding. A fastening hole 42d is at (or formed through) the upper plate 42a. When a protrusion on (or formed on) the lower portion of the connection terminal 25 is inserted into the fastening hole 42d, the connection terminal 25 and the upper plate 42a may be, for example, welded together.

The side plate 42b is bent (or formed to be bent) downwardly from an end of a side of the upper plate to the bottom of the case 26. The two current collecting shoes 42c are bent (or formed to be bent) from the ends of both sides of the side plate 42b, and to be adhered to the negative electrode 12 by, for example, welding while being parallel (e.g., substantially parallel) to the uncoated region of the negative electrode 12. Accordingly, the current collecting shoe 42c may be (or becomes) an electrode adhesion unit electrically connected to the negative electrode 12. The two electrode assemblies 10 are disposed in the case 26. The current collecting shoes 42c are adhered to the negative electrode uncoated regions 12a of the different electrode assemblies 10.

A second fuse unit 42f having a cross-sectional area that is smaller than that of a periphery (e.g., a periphery of the second current collecting member 42 or the upper plate 42a) is on (or formed on) the upper plate 42a. A fuse hole 42e is at (or formed through) the second fuse unit 42f, and thus the second fuse unit 42f has a longitudinal cross-sectional area that is smaller than that of the periphery. The fuse hole 42e is at (or positioned at) the center of the second fuse unit 42f. The second fuse unit 42f is connected to (or formed to be connected to) ends of both sides of the fuse hole 42e.

The first fuse unit 41f and the second fuse unit 42f are melted (or are configured to be melted) when an over-current (e.g., a current above a set level) flows, thereby blocking a flow of current through the first fuse unit 41f and the second fuse unit 42f. The intensity of a current at which the first fuse unit 41f is melted is a first current (e.g., a first set current), and the intensity of a current at which the second fuse unit 42f is melted is a second current (e.g., a second set current). The first current and the second current may have different values.

The first current has a value that is higher than that of the second current. The first fuse unit 41f is melted more quickly than the second fuse unit 42f at the first current. Further, the second fuse unit 42f is melted more quickly than the first fuse unit 41f at the second current.

When an over-current in the range of the first current is caused by factors, such as a short-circuit or overcharging, the first fuse unit 41f is melted more quickly than the second fuse unit 42f. When the first fuse unit 41f is melted, electrical connection between the first terminal 21 and the positive electrode 11 is blocked, and a current no longer flows through the second fuse unit 42f.

Meanwhile, when an over-current in the range of the second current is formed (or present), the second fuse unit 42f is first melted but the first fuse unit 41f is not melted. The first current may be 1.5 times to 3.5 times that of the second current (e.g., a ratio of the first current to the second current may be 1.5:1 to 3.5:1). Further, the first current may be 3000 (or more than 3000) to 10,000 A and the second current may be 500 to 3000 (or less than 3000) A.

In the rechargeable battery 101 having a rated output current of 60 to 120 A, 500 A is a very high current and corresponds to an over-current, which corresponds to a malfunction occurring (or having occurred) in the rechargeable battery 101. When an over-current having a low intensity continuously flows, the temperature of the rechargeable battery 101 is increased and an abnormal reaction occurs. However, the over-current having the low intensity is a lower current than a current present when a short-circuit occurs, and the over-current having the low intensity does not melt a fuse unit designed to block a short-circuit current.

According to the present first example embodiment, the second fuse unit 42f is operated at the second current as the over-current having the low intensity (e.g., the second fuse unit 42f is melted at the second current having the low intensity), and the first fuse unit 41f is operated at the first current as the over-current having the high intensity (e.g., the first fuse unit 41f is melted at the first current having the high intensity), and thus safety may be improved. Thus, the second current may have an electric current that is lower than an electric current of the first current.

In order to melt the first fuse unit 411 more quickly than the second fuse unit 42f at the first current, when a melting point of the first fuse unit 41f is M1 and a melting point of the second fuse unit 42f is M2, a resistance of the first fuse unit 41f is M1/M2 times (e.g., multiplied by) that of the second fuse unit 42f.

If a resistance of the first fuse unit 41f is M1/M2 times (e.g., multiplied by) that of the second fuse unit 42f, when the first current flows, the first fuse unit 41f is melted more quickly than the second fuse unit 42f. When the first current flows, because the fuse units are quickly heated, the respective resistances and the melting points of the fuse units affect their respective melting times.

The respective melting points of the first fuse unit 41f and the second fuse unit 42f are affected (or determined) by materials included in (or constituting the) first fuse unit 41f and the second fuse unit 42f. Meanwhile, the respective resistances of the first fuse unit 41f and the second fuse unit 42f are affected (or determined) by the respective specific resistances, lengths, and cross-sectional areas of the first fuse unit 41f and the second fuse unit 42f. Specific resistance is affected (or determined) by the material (or composition) of the fuse unit, and the length and the cross-sectional area are affected (or determined) by a shape of the fuse unit. Accordingly, when the respective lengths and cross-sectional areas of the fuse units are suitably adjusted, the first fuse unit 41f may be melted more quickly than the second fuse unit 42f at the first current.

The first fuse unit 41f may include (or be formed of) aluminum (Al) and the second fuse unit 42f may include (or be formed of) copper (Cu), but the present disclosure is not limited thereto. In this embodiment, the specific resistance of the first fuse unit 41f is 2.62 $\Omega mm^2/m$, and the melting point of the first fuse unit 41f is 660° C. Further, in this embodiment, the specific resistance of the second fuse unit 42f is 1.69 $\Omega mm^2/m$ and the melting point of the second fuse unit 42f is 1084° C. Accordingly, in this embodiment, the first fuse unit 41f has a specific resistance that is larger than that of the second fuse unit 42f, and the first fuse unit 41f has a melting point that is lower than that of the second fuse unit 42f. When the first fuse unit 41f includes (or is) aluminum and the second fuse unit 42f includes (or is copper), resistance R1 of the first fuse unit 41f is 0.6 times the resistance R2 of the second fuse unit 42f (e.g., R1=0.6R2).

Meanwhile, when the second current flows, because the first fuse unit and the second fuse unit are heated more slowly at the second current than at the first current, a heat emitting (or heat conduction) characteristic of the first fuse unit or the second fuse unit significantly affects the melting time (of the first fuse unit or the second fuse unit). For example, when an excellent heat emission condition is formed (or present) at the first fuse unit, even though the first fuse unit is heated by the second current, if the temperature approaches a temperature of a predetermined (or set) value or more, emitted heat (at the first fuse unit) is similar to generated heat (at the first fuse unit), and thus the first fuse unit is very slowly heated. However, the first fuse unit or the second fuse unit may be heated to be melted at a condition where heat is not emitted well.

Accordingly, even though specific resistance is small and the melting point is high, the second fuse unit 42f may be melted more quickly at the second current than the first fuse unit 41f. For example, the second fuse unit 42f may be (or may be formed to be) longer than the first fuse unit 41f, and have a cross-sectional area that is smaller than that of the first fuse unit 41f.

A length L2 of the second fuse unit 42f is larger than a length L1 of the first fuse unit 41f, and the heat emitting member 46 is at (or provided in) the first fuse unit 41f. Accordingly, because the first fuse unit 41f is capable of emitting heat more quickly than the second fuse unit 42f, the second fuse unit 42f may be reliably melted more quickly than the first fuse unit 41f at the second current.

In other batteries, when the second fuse unit 42f including (or formed of) copper is melted at the first current as a relatively high current, copper may be eluted. Further, when the second fuse unit 42f is not melted at the second current at which the low over-current continuously flows, the case 26 electrified by the positive electrode and the second current collecting member 42 electrified by the negative electrode may short-circuit. However, according to the present example embodiment, because the first fuse unit 41*f* including (or formed of) aluminum is melted at the first current and the second fuse unit 42*f* including (or formed of) copper is melted at the second current, safety of the rechargeable battery 101 is improved.

Herein, the first fuse unit 41*f* may have a thickness of 1.0 to 1.5 mm and a width of 3.0 to 6.0 mm. The first fuse unit 41*f* may have a length of 1.0 to 3.0 mm and a cross-sectional area of 3.0 to 9.0 mm. The second fuse unit 42*f* may have a thickness of 0.6 to 1.5 mm and a width of 1.5 to 3.0 mm. The second fuse unit 42*f* may have a length of 1.0 to 5.0 mm and a cross-sectional area of 1.0 to 4.5 mm. The first current may be 3000 (or more 3000) to 6000 A, and the second current may be 500 to 3000 (or less than 3000) A.

Figure 7:
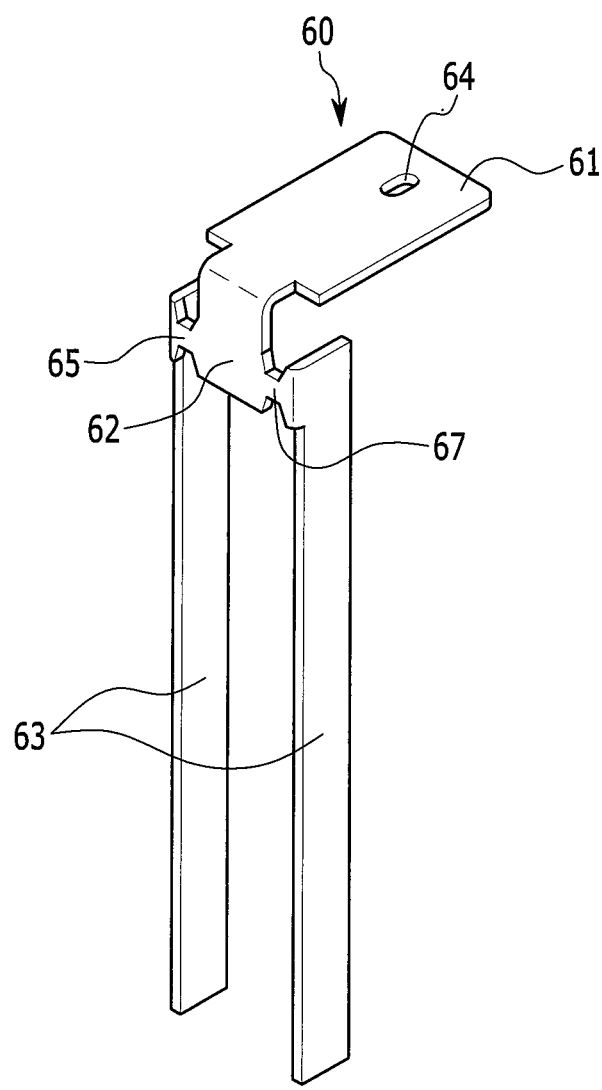
FIG. 7 is a perspective view of a first current collecting member according to a second example embodiment of the present invention.

FIG. 7 is a perspective view of a first current collecting member according to a second example embodiment of the present invention.

Referring to FIG. 7, because a rechargeable battery according to the present example embodiment has the same (or substantially the same) structure as the rechargeable battery according to the first example embodiment with the exception of a structure of a first current collecting member 60, an overlapping description of the features or structures that are substantially the same as those described with respect to the first example embodiment will not be provided again here.

The first current collecting member 60 adheres to (or is adhered to) the positive electrode 11 of the electrode assembly 10 to electrically connect the positive electrode 11 and the first terminal 21. The first current collecting member 60 includes an upper plate 61 adhered to the connection terminal 25, a side plate 62 extending from the upper plate 61 bent (or formed to be bent) downwardly toward the electrode assembly 10, and two current collecting shoes 63 connected to (or formed to be connected to) the side plate 62 and adhered to the electrode assembly 10.

The upper plate 61 has a quadrangular plate shape, and is fixed to a lower portion of the connection terminal 25 by, for example, welding. A fastening hole 64 is at (or formed through) the upper plate 61. When (or after) a protrusion on (or formed on) the lower portion of the connection terminal 25 is inserted into the fastening hole 64, the connection terminal 25 and the upper plate 61 are, for example, welded together.

The side plate 62 is bent (or formed to be bent) downwardly from an end of a side of the upper plate 61 to the bottom of the case 26. The two current collecting shoes 63 are connected (or formed to be connected) to the side plate 62. The current collecting shoes 63 are adhered to the positive electrode 11 by, for example, welding while being parallel (e.g., substantially parallel) to the uncoated region of the positive electrode 11.

First fuse units 65 and 67 each having a cross-sectional area that is smaller than that of a periphery (e.g., a periphery of the first current collecting member 60 or the upper plate 61) are between (or formed between) the side plate 62 and the current collecting shoes 63. The first fuse units 65 and 67 face (or are exposed to face) the side plate of the case 26, and may easily emit heat. Further, because the two first fuse units 65 and 67 are separated (or formed to be separated), when the second current flows to perform heating, heat may be easily emitted (e.g., conducted) to the current collecting shoes 63 and the side plate 62.

Figure 8:
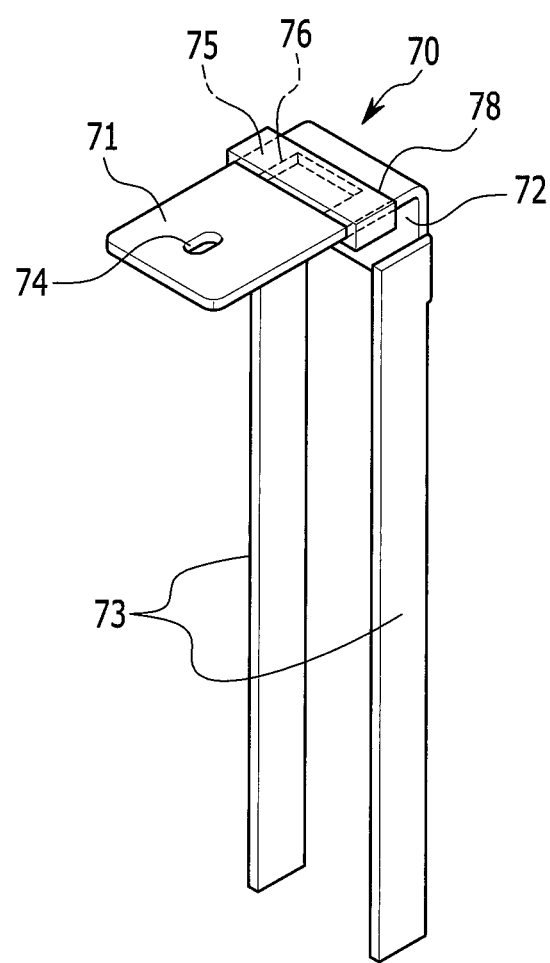
FIG. 8 is a perspective view of a second current collecting member according to a third example embodiment of the present invention.

FIG. 8 is a perspective view of a second current collecting member according to a third example embodiment of the present invention.

Referring to FIG. 8, because a rechargeable battery according to the present example embodiment has the same (or substantially the same) structure as the rechargeable battery according to the first example embodiment with the exception of a structure of a second current collecting member 70, an overlapping description of the features or structures that are substantially the same as those described with respect to the first example embodiment will not be provided again here.

The second current collecting member 70 is adhered to the negative electrode 12 of the electrode assembly 10 to electrically connect the negative electrode 12 and the second terminal 22. The second current collecting member 70 includes an upper plate 71 adhered to the connection terminal 25, a side plate 72 extending from the upper plate 71 bent (or formed to be bent) downwardly toward the electrode assembly 10, and two current collecting shoes 73 connected (or formed to be connected) to the side plate 72 and adhered to the electrode assembly 10.

The upper plate 71 has a quadrangular plate shape, and is fixed to the lower portion of the connection terminal 25 by, for example, welding. A fastening hole 74 is at (or formed through) the upper plate 71. When (or after) a protrusion on (or formed on) the lower portion of the connection terminal 25 is inserted into the fastening hole 74, the connection terminal 25 and the upper plate 71 are, for example, welded together.

The side plate 72 is bent (or formed to be bent) downwardly from an end of a side of the upper plate 71 to the bottom of the case 26. The two current collecting shoes 73 are connected (or formed to be connected) to the side plate 72. The current collecting shoes 73 are bent (or formed to be bent) from the ends of both sides of the side plate 72, and adhered (or formed to be adhered) to the negative electrode 12 by, for example, welding while being parallel (e.g., substantially parallel) to the uncoated region of the negative electrode 12.

A second fuse unit 75 having a cross-sectional area that is smaller than that of a periphery (e.g., a periphery of the second current collecting member 70 or the upper plate 71) is at (or formed in) the upper plate 71, and a fuse hole 76 is at (or formed at) the center of the second fuse unit 75. An adiabatic member 78 surrounding the second fuse unit 75 is provided to the second fuse unit 75. The adiabatic member 78 may be formed by insert molding (e.g., injection molding) or coating of a film and the like. The adiabatic member 78 includes (or is formed of) a polymer material having low thermal conductivity, but a material thereof is not particularly limited. According to the present example embodiment, when the adiabatic member 78 is provided to the second fuse unit 75, because emission (e.g., conduction) of heat from the second fuse unit 75 is reduced, the second fuse unit 75 may be easily melted at the second current. For example, the adiabatic member 78 may reduce the emission (e.g., conduction) of heat from the second fuse unit 75, thereby causing the second fuse unit 75 to retain heat and thereby facilitating the melting of the second fuse unit 75 at the second current.

While the present invention has been described in connection with what is presently considered to be practical example embodiments, it is to be understood that the invention is not limited to the disclosed embodiments, but, on the contrary, is intended to cover various modifications and equivalent arrangements included within the scope of the appended claims (and equivalents thereof), the detailed description, and the drawings.

DESCRIPTION OF SOME OF THE REFERENCE NUMERALS

| | |
|---|---|
| 101: rechargeable battery | 10: electrode assembly |
| 11: positive electrode | 11a: positive electrode uncoated region |
| 12: negative electrode | 12a: negative electrode uncoated region |
| 13: separator | 21: first terminal |
| 22: second terminal | 25: connection terminal |
| 26: case | 30: cap assembly |
| 31: cap plate | 41, 60: first current collecting member |
| 41a, 42a, 61, 71: upper plate | 41b, 42b, 62, 72: side plate |
| 41c, 42c, 63, 73: current collecting shoe | 41d, 42d, 64, 74: fastening hole |
| 41e, 42e, 76: fuse hole | 41f, 65, 67: first fuse unit |
| 42f, 75: second fuse unit | 42, 70: second current collecting member |
| 43: lower insulating member | 45: lower insulating member |
| 46: heat emitting member | 54: upper insulating member |
| 56: short-circuit member | 58: connection member |
| 78: adiabatic member | |

What is claimed is:

1. A rechargeable battery comprising:
an electrode assembly comprising a first electrode and a second electrode;
a case configured to receive the electrode assembly;
a first current collecting member comprising a first fuse unit coupled to the first electrode and having a cross-sectional area that is smaller than a cross-sectional area of a periphery of the first current collecting member; and
a second current collecting member comprising a second fuse unit coupled to the second electrode and having a cross-sectional area that is smaller than a cross-sectional area of a periphery of the second current collecting member,
wherein the first fuse unit is configured to melt more quickly than the second fuse unit at a first current, and the second fuse unit is configured to melt more quickly than the first fuse unit at a second current that is lower than the first current, and
wherein a melting point of the first fuse unit is M1, a melting point of the second fuse unit is M2, and a resistance of the first fuse unit is equal to M1/M2 multiplied by a resistance of the second fuse unit.

2. The rechargeable battery of claim 1, wherein the second fuse unit is longer than the first fuse unit.

3. The rechargeable battery of claim 2, wherein the second fuse unit has a cross-sectional area that is smaller than a cross-sectional area of the first fuse unit.

4. The rechargeable battery of claim 3, wherein the first fuse unit comprises a material having a specific resistance that is higher than a specific resistance of a material of the second fuse unit.

5. The rechargeable battery of claim 4, wherein a melting point of the material of the first fuse unit is lower than a melting point of the material of the second fuse unit.

6. The rechargeable battery of claim 5, wherein the material of the first fuse unit comprises aluminum, and the material of the second fuse unit comprises copper.

7. The rechargeable battery of claim 1, wherein a heat emitting member configured to diffuse heat is at the first fuse unit.

8. The rechargeable battery of claim 1, wherein an adiabatic member configured to reduce emission of heat is at the second fuse unit.

9. The rechargeable battery of claim 1, wherein the first current is 1.5 times to 3.5 times the second current.

10. The rechargeable battery of claim 9, wherein the first current is 500 to 3000 A and the second current is 3000 to 10,000 A.

11. The rechargeable battery of claim 1, wherein the case is electrically coupled to the first electrode.

12. The rechargeable battery of claim 11, wherein a cap plate is fastened to the case, and a short-circuit member that is configured to be deformed by an increase in internal pressure of the rechargeable battery to electrically couple the first electrode and a second electrode is at the cap plate.

* * * * *